(12) United States Patent
Peisa et al.

(10) Patent No.: US 8,300,542 B2
(45) Date of Patent: Oct. 30, 2012

(54) VOIP PERFORMANCE OPTIMIZATION FOR E-DCH POWER LIMITATION

(75) Inventors: Janne Peisa, Espoo (FI); Mats Sagfors, Kyrkslatt (FI); Tomas Frankkila, Lulea (SE); Daniel Enström, Gammelstad (SE); Ghyslain Pelletier, Boden (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 540 days.

(21) Appl. No.: 12/278,486

(22) PCT Filed: Jan. 30, 2007

(86) PCT No.: PCT/SE2007/000081
§ 371 (c)(1),
(2), (4) Date: Dec. 17, 2008

(87) PCT Pub. No.: WO2007/091941
PCT Pub. Date: Aug. 16, 2007

(65) Prior Publication Data
US 2009/0103450 A1    Apr. 23, 2009

Related U.S. Application Data

(60) Provisional application No. 60/765,203, filed on Feb. 6, 2006.

(51) Int. Cl.
*G08C 15/00* (2006.01)
(52) U.S. Cl. ...................................... 370/252
(58) Field of Classification Search ............... 370/252
See application file for complete search history.

(56) References Cited

U.S. PATENT DOCUMENTS

| | | | |
|---|---|---|---|
| 6,847,610 B1 * | 1/2005 | Suumaki et al. | 370/230.1 |
| 6,999,432 B2 * | 2/2006 | Zhang et al. | 370/328 |
| 7,222,196 B2 * | 5/2007 | Asthana et al. | 709/250 |
| 2004/0090917 A1 * | 5/2004 | Ruutu et al. | 370/235 |

(Continued)

FOREIGN PATENT DOCUMENTS

| | | |
|---|---|---|
| EP | 1521408 A2 | 4/2005 |
| EP | 1718005 A1 | 11/2006 |
| JP | A 2004-015761 | 1/2004 |

OTHER PUBLICATIONS

Parkvall Setal: "WCDMA Enhanced Uplink-Principles and Basic Operation", 2005 IEEE 61ST Vehicular Technology Conference. VTC2005—Spring—May 30-Jun. 1, 2005—Stockholm, Sweden, IEEE, Piscataway, NJ, USA, vol. 3, May 30, 2005 XP010855655, DOI: 10.1109/VETECS.2005.1543552 ISBN: 978-0-7803-8887-1.

(Continued)

*Primary Examiner* — Mark Rinehart
*Assistant Examiner* — Matthew Hopkins

(57) ABSTRACT

User equipment in a wireless communication system monitors scheduling information and locally detects a change in link data rate of the uplink channel based on the monitored scheduling information. In this way, a change in link data rate can be detected directly without significant delay. This direct or early detection of a rate change is then combined with an appropriate system reaction. The information of the detected change in link data rate is preferably utilized for adapting the application data rate of an IP application running in the user equipment. As an alternative, or as a complement, data packets are classified based on relative importance and selected for transfer of information over the uplink channel based on the classification of data packets and in dependence on the detected change in link data rate.

17 Claims, 10 Drawing Sheets

U.S. PATENT DOCUMENTS

2004/0219920 A1* 11/2004 Love et al. .................... 455/442

OTHER PUBLICATIONS

Dong-Hoon Cho et al: "Performance Analysis of the IEEE 802.16 Wireless Metropolitan Area Network", Distributed Frameworks for Multimedia Applications, 2005. DFMA '05. FI RST International Conference on Besoncon, France Feb. 6-9, 2005, Piscataway, NJ, USA, IEEE, Feb. 6, 2005, XP010770238, DOI: 10.1109/DFMA.2005.41 ISBN: 978-0-7695-2273-9.

* cited by examiner

VOIP PERFORMANCE OPTIMIZATION FOR E-DCH POWER LIMITATION

This application claims the benefit of US Provisional Application No. 60/765,203, filed Feb. 6, 2006, the disclosure of which is fully incorporated herein by reference.

TECHNICAL FIELD

The present invention generally relates to wireless communication and more particularly to Internet Protocol (IP) based wireless communication technology.

BACKGROUND

Wireless communication has undergone a tremendous development in the last decade. With the evolution and development of wireless networks towards 3G-and-beyond, packet data services have been the major focus with the aim to provide e.g. higher bandwidth and accessibility to the Internet. Hence, protocols and network architectures including end user devices and terminals are normally designed and built to support Internet Protocol (IP) services as efficiently as possible.

For example, the evolution of the WCDMA specification with High Speed Downlink Packet Access (HSDPA) in the downlink and Enhanced Dedicated Channel (E-DCH) in the uplink provides an air interface that has been optimized to transmit IP packets over the WCDMA radio access interface. This has lead to a possibility of providing also conversational services (media applications) over IP with high spectrum efficiency (comparable or even exceeding the performance of existing circuit switched conversational bearers). FIG. 1 illustrates relevant parts of a simplified radio communication system with a base station 100 such as a Node B in communication with user equipment (UE) 200 over the traditional downlink and uplink. The UE 200 implements an IP stack according to accepted standard technology. The protocol stack normally involves the physical layer, the data link layer, the network layer, the transport layer and the application layer. In the case of an IP stack, the network layer is based on IPv4 or IPv6, or mobile counterparts such as MIPv4 or MIPv6, and is often simply referred to as the IP layer or the Internet layer.

The conversational services may consist of various service or application components, such as voice, video or text based communication. Each service component has different requirements regarding minimum usable data rate, possibility to adapt to variation in the data rate, allowed delay and packet loss, etc. The communication application may adapt to changes in various ways, for example:

Voice codecs based on AMR may use different modes resulting in different applications.
The number of service components for an application may be reduced, e.g. by deciding to drop the video component and only keep voice.

E-DCH provides a dedicated channel that has been enhanced for IP transmission, as specified in the standardization documents 3GPP TS 25.309 and TS 25.319. The enhancements include:

Possibility to use a shorter TTI (Transmission Time Interval).
Fast hybrid ARQ (HARQ) between mobile terminal and the base station.
Scheduling of the transmission rates of mobile terminals from the base station.

Similarly to HSDPA in the downlink, there will be a packet scheduler for E-DCH in the uplink, but it will normally operate on a request-grant principle, where the user equipment (UE) or terminal requests a permission to send data and the scheduler on the network side decides when and how many terminals will be allowed to do so. A request for transmission will normally contain data about the state of the transmission data buffer and the queue at the terminal side and its available power margin. The standard foresees two basic scheduling methods. Long term grants are issued to several terminals which can send their data simultaneously using code multiplexation. Short term grants on the other hand allow multiplexing of terminals in the time domain. In order to allow multiplexing uplink transmissions of several terminals in both code and time domain the scrambling and channelization codes are expected to not be shared between different terminals.

Assuming that the dedicated physical data channel (DPDCH) and the dedicated physical control channel (DPCCH) are code-multiplexed and transmitted simultaneously in time, the ratio between their transmit powers is important for the achievable payload data rates. When a larger part of the terminal's power is assigned to DPDCH the achievable payload data rate increases. In UMTS Release 99 the ratio between the power of DPDCH and DPCCH was set to a constant value. For E-DCH, this ratio will generally be controlled by the base station (Node B) and signaled to the terminals in the scheduling grant commands.

When using E-DCH or similar uplink technology, there are two mechanisms that can restrict the data rate of an individual UE. First, the base station may lower the current data rate of the UE by updating the serving grant (i.e. by scheduling). Second, the UE may not have sufficient transmission power to maintain the current data rate, in which case the UE will automatically limit the transmission rate. This autonomous reduction typically occurs when the UE is close to the edge of the cell.

Similarly, the rate of an individual UE may be increased by updating the serving grant from the Node B, or—if the UE was power limited—it may increase the rate autonomously as soon as sufficient power comes available.

Reducing the link data rate may lead to problems with conversational applications. In general, if the data rate of an application exceeds the link data rate, packets will be first buffered and eventually (once the buffers overflow) dropped. The buffering leads to increased transmission delay, and reduced conversational quality, while the packet losses lead directly to reduced quality.

When increasing the link rate, it would be possible for the application to improve the quality by e.g. increasing the data rate or by adding new service components to the call. However, the application needs to probe (e.g. by trying to increase the transmission rate and observing the resulting packet loss and/or delay) for the available bandwidth before improving the quality. This probing mechanism needs to be conservative in order to avoid increasing load in congested situation, which makes it necessarily slow.

Using link quality measures such as end-to-end packet loss or received signal strength, will generally lead to both late detection of the rate change of E-DCH or similar uplink channel and limited possibility to detect the new link data rate.

Late detection of the rate change will result in packets being queued by the E-DCH link layer. The queuing leads to increased conversational delay or late losses.

In general, using a probing mechanism to detect increase in the available data rate leads to both slow recovery from reduced link rate and slow reaction to available high data rate. Furthermore, all probing mechanisms may increase the load in congested situations and thus reduce the performance.

Estimating the link data rate too high will again lead to queuing and/or packet loss. Estimating the link data rate too low will lead to too low application data rate being used. This in general results in worse (speech) quality.

There is thus a general demand for improving the performance of an uplink channel between user equipment and a base station in a wireless communication system.

SUMMARY

The present invention overcomes these and other drawbacks of the prior art arrangements.

It is a general object of the present invention to improve the performance of an uplink channel between user equipment implementing an Internet Protocol (IP) stack and a base station in a wireless network.

In particular it is desirable to support and enhance the operation of IP applications such as VoIP (Voice over IP), especially at difficult radio conditions and/or when the system is congested.

It is a particular object of the invention to provide a method for improving the performance of an uplink channel between user equipment and a base station in a wireless network.

It is another particular object of the invention to provide user equipment adapted for implementing an IP stack and running an IP application with improved performance.

These and other objects are met by the invention as defined by the accompanying patent claims.

A careful analysis has revealed that a main problem with the existing solutions is that indirect link quality measures, such as end-to-end packet loss or received signal strength, will lead to both late detection of the rate change of the uplink channel and limited possibility to detect the new link data rate. Late detection of the rate change will result in packets being queued by the link layer. The queuing leads to increased conversational delay or late losses. In order to reduce the queuing, it may be preferable to drop packets. However, the link layer traditionally has no information about the importance of various frames, and dropping packets may lead to reduced quality.

In accordance with a first aspect of the invention, a basic idea is to monitor scheduling information in the user equipment and locally detect a change in link data rate of the uplink channel based on the monitored scheduling information, and then use the information of the detected change in link data rate to adapt the application data rate of an IP application running in the user equipment.

In this way, a change in link data rate can be detected directly without significant delay, and the behavior of the application can be naturally adapted to the early detection of a change in link data rate.

In general, the adaptation of the application data rate can be performed on the application layer directly in the user equipment or alternatively controlled from the network side.

In accordance with a second aspect of the invention, a basic idea is to monitor scheduling information in the user equipment and locally detect a change in link data rate of the uplink channel based on the monitored scheduling information, and then classify data packets based on relative importance and select data packets for transfer of information over the uplink channel based on the classification of data packets and in dependence on the detected change in link data rate.

In this way, a change in link data rate can be detected directly without significant delay, and data packets can be scheduled and/or dropped accordingly depending on the detected change in link data rate.

In all aspects of the invention, the scheduling information is preferably, although not necessarily, received from the base station. It may for example include information on the power ratio that determines how much of the total transmission power of the user equipment to spend on a dedicated data channel to be used for uplink data communication.

The invention is generally applicable for improving the performance of any type of uplink channel, but especially suitable for E-DCH to transmit IP packets over the WCDMA radio access interface.

It should also be understood that the first aspect and the second aspect of the invention can be combined; using both direct adaptation of the application data rate in response to the early detection of a change in link data rate and selection of data packets further based on a classification of the data packets.

The invention offers the following main advantages:

Improved uplink channel performance.

Reduced delay.

Reduced packet loss.

Enhanced media quality.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS

Figure 1:
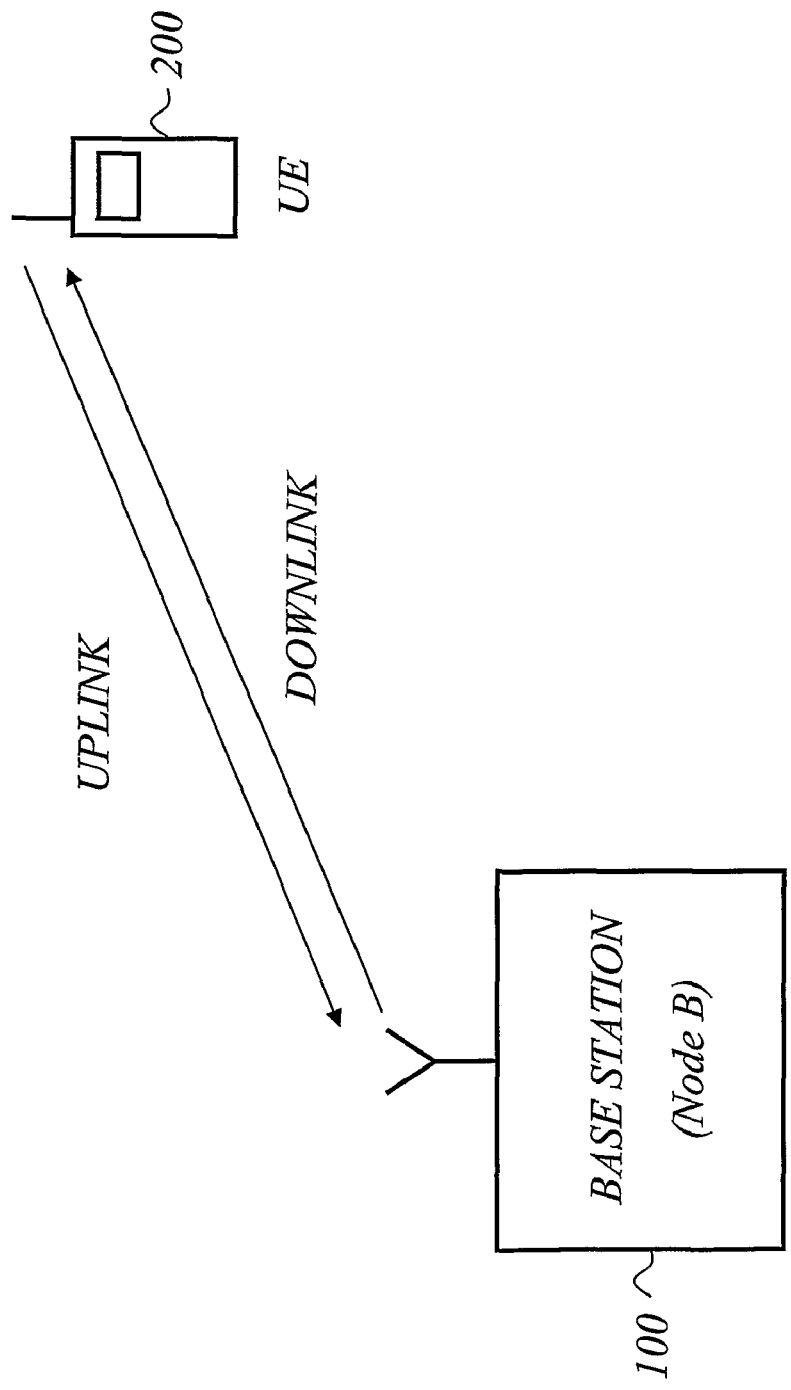
FIG. 1 is a schematic diagram of a simplified radio communication system illustrating a base station in communication with user equipment.

Throughout the drawings, the same reference characters will be used for corresponding or similar elements.

As mentioned, one of the main problems in the prior art is that indirect link quality measures, such as end-to-end packet loss or received signal strength, will lead to both late detection of the rate change of the uplink channel and limited possibility to detect the new link data rate. Late detection of the rate change will then result in packets being queued by the link layer. The queuing in turn leads to increased conversational delay or late losses. In order to reduce the queuing, it may be preferable to drop packets. However, the link layer traditionally has no information about the importance of various frames, and dropping packets may lead to reduced quality. This causes a complex and somewhat contradictory situation.

The invention provides a solution to the above problem based on a new mechanism for early detection of changes in the link data rate of the considered uplink channel combined with an appropriate system reaction in response to the detected change.

Figure 2:
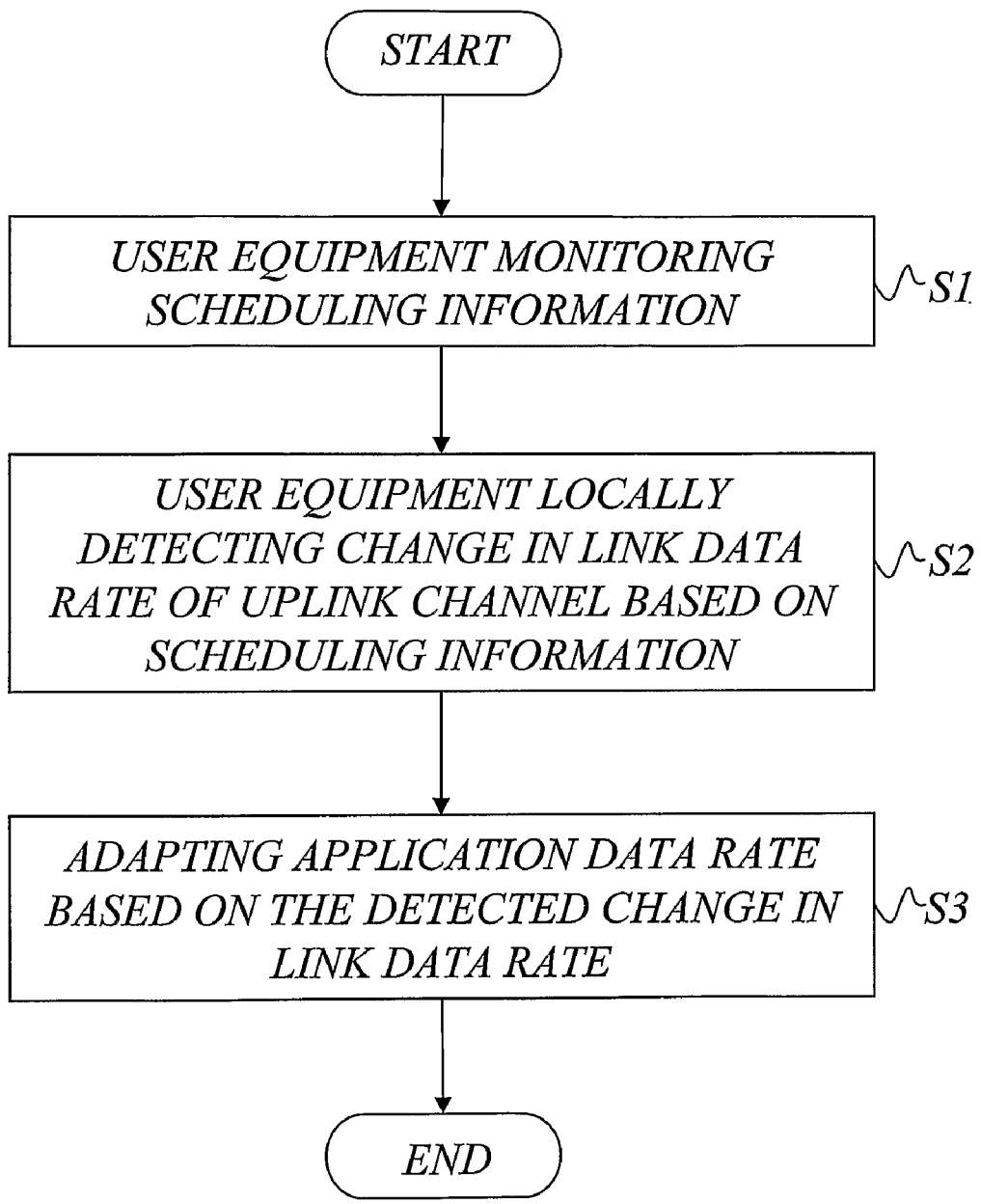
FIG. 2 is a schematic flow diagram of an exemplary basic method according to a first aspect of the invention.

In a first aspect of the invention, referring to FIG. 2, the user equipment monitors (S1) scheduling information and locally detects (S2) a change in link data rate of the uplink channel based on the monitored scheduling information. The information of the detected change in link data rate can then be used to adapt (S3) the application data rate of an IP application running in the user equipment. In this way, a change in link data rate can be detected directly without significant delay, and the behavior of the application can be adapted to the early detection of a change in link data rate.

The adaptation of the application data rate can be performed on the application layer directly in the user equipment or alternatively initiated from the network side. The information on the new link data rate may for example be signaled to the application layer, where a more appropriate application data rate can be selected. The adaptation of the application data rate may be performed by deciding which service components (e.g. voice, video, text) to support for a given application, such as removing a component that can no longer be supported or adding a component that could be supported, or reducing the frame rate of a multi-media application. It is also possible to let the network side determine which service components to support based on signaled information on the new link data rate.

Figure 3:
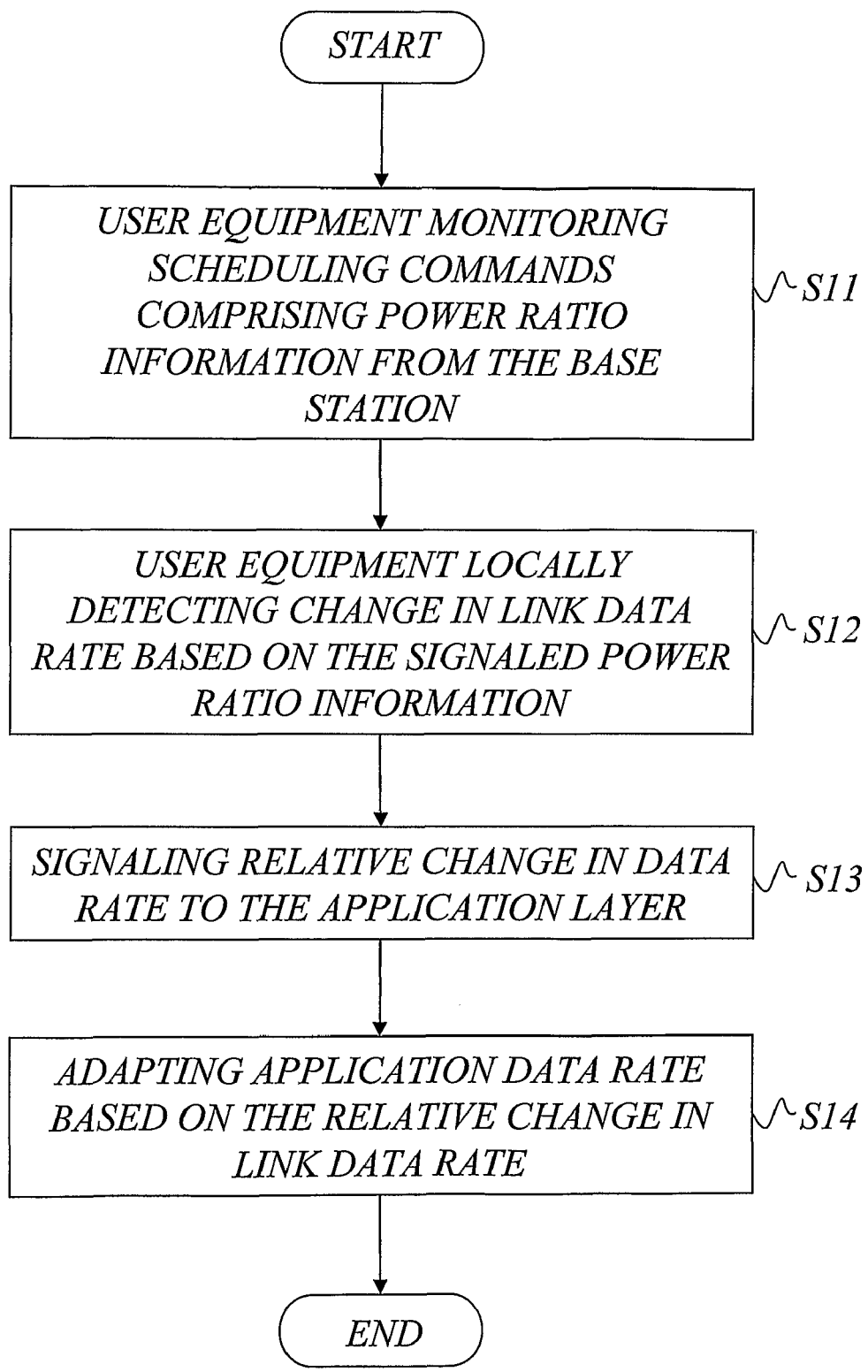
FIG. 3 is a more detailed flow diagram of a preferred exemplary embodiment according to the first aspect of the invention.

FIG. 3 is a more detailed flow diagram of a preferred exemplary embodiment according to the first aspect of the invention. In this particular embodiment, the user equipment monitors (S11) scheduling commands from the base station that include information on the power ratio that determines how much of the total transmission power of the user equipment to spend on a dedicated data channel (e.g. E-DCH) to be used for uplink data communication. Using this information, the user equipment locally detects (S12) a change in link data rate. There are many ways to detect the change in data rate based on information about the power ratio. For example, a change in data rate can be detected by detecting a change in power ratio signaled from the base station. Any change in power ratio can be mapped to an increase or decrease in data rate. Alternatively, the user equipment determines whether it has sufficient transmission power to reach a current power ratio signaled from the base station by comparing an estimate of the available power of the UE for transmitting on the dedicated data channel with the signaled power ratio. If the available data transmission power of the UE is lower than the signaled power ratio (UE is power-limited) the data rate will effectively be reduced. The application level data rate is normally proportional to the value of the power ratio, and thus it is possible to signal (S13) a relative rate change to the application layer. This makes it possible to adapt (S14) the application data rate accordingly, based on the relative change in link data rate. For example, the application may use the (relative) data rate to determine which encoding mode, redundancy mode, bit rate and/or frame rate to use for the application, and/or which service components to support.

Instead of using the scheduling commands from the base station including power ratio information, another way of detecting a change in data rate involves local scheduling information representative of the status of the data buffer in the UE. In this alternative embodiment, the rate change is detected by locally identifying a data buffer build-up in the UE.

Figure 4:
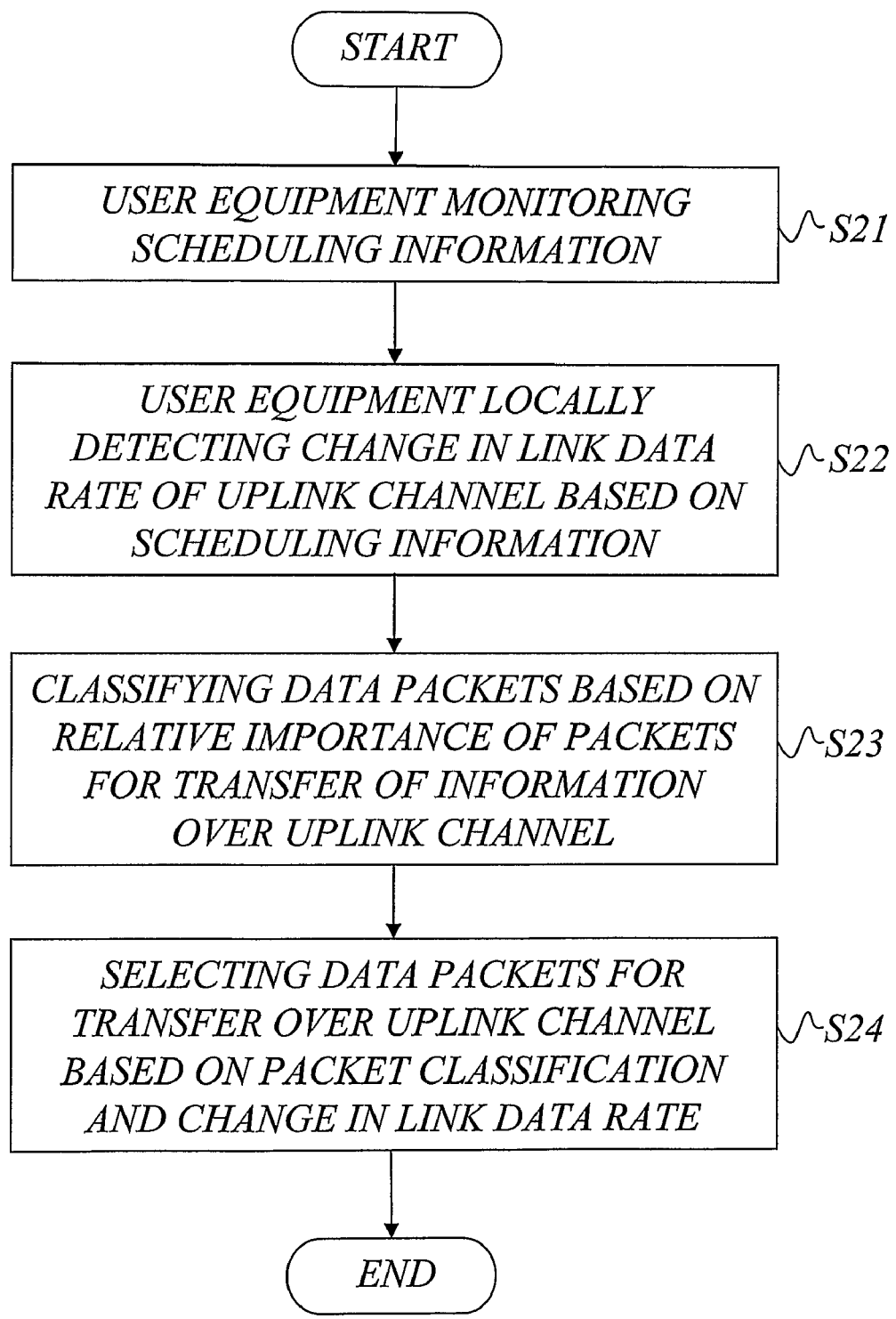
FIG. 4 is a schematic flow diagram of an exemplary basic method according to a second aspect of the invention.

In a second aspect of the invention, referring to FIG. 4, the user equipment monitors (S21) scheduling information and locally detects (S22) a change in link data rate of the uplink channel based on the monitored scheduling information. Next, data packets are classified (S23) based on relative importance of the respective packets for transfer of information over the uplink channel. This makes it possible to select (S24) data packets for transfer over the uplink channel based on the classification of data packets and the detected change in link data rate. In this way, a change in link data rate can be detected directly without significant delay, and data packets can be scheduled and/or dropped accordingly depending on the detected change in link data rate.

Figure 5:
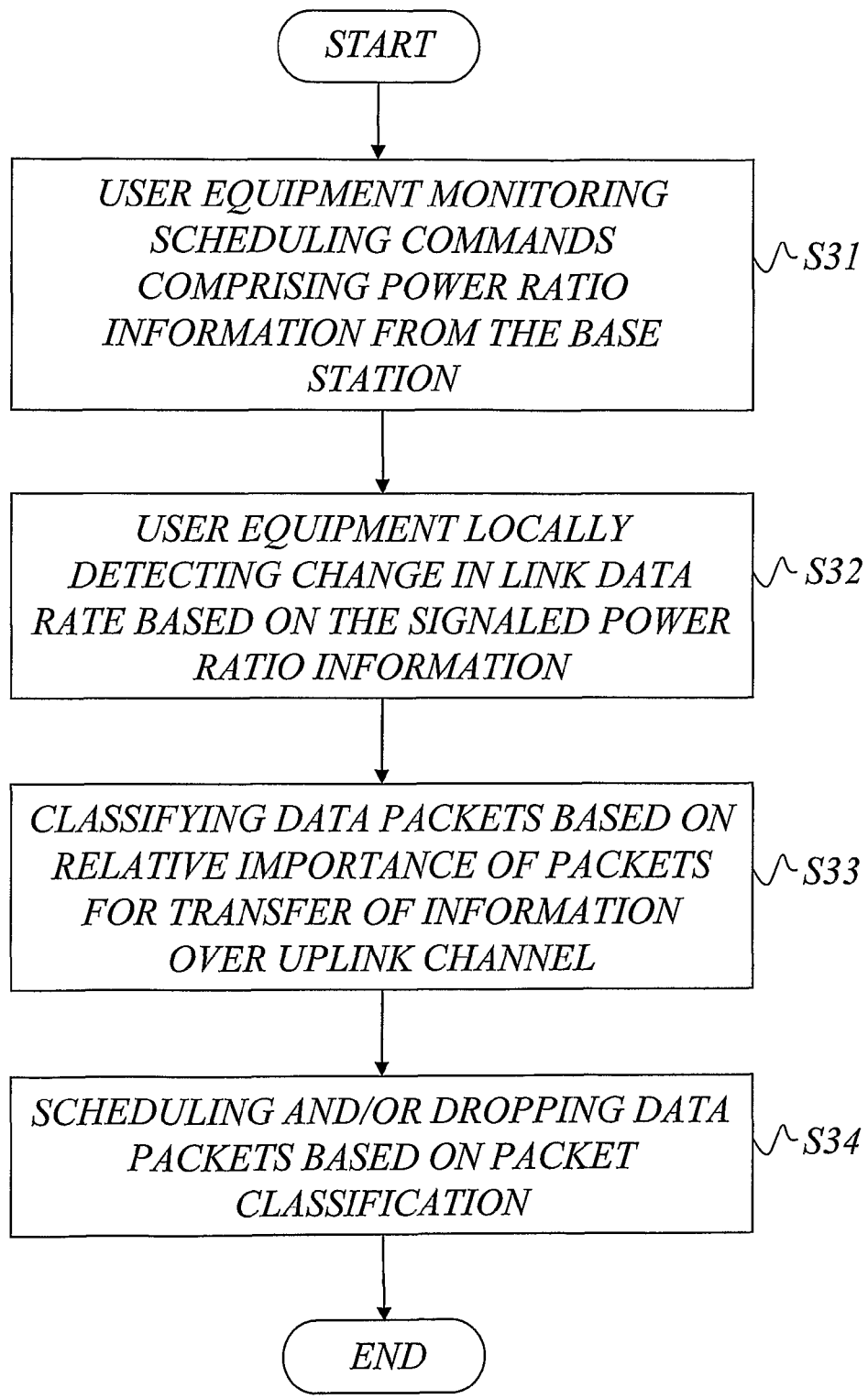
FIG. 5 is a more detailed flow diagram of a preferred exemplary embodiment according to the second aspect of the invention.

FIG. 5 is a more detailed flow diagram of a preferred exemplary embodiment according to the second aspect of the invention. In this particular embodiment, the user equipment monitors (S31) scheduling commands from the base station that include information on the power ratio that determines how much of the total transmission power to spend on a dedicated data channel (e.g. E-DCH). Based on this information, the user equipment locally detects (S32) a change in link data rate. Data packets are classified (S33) based on their relative importance, for example on the application layer or on a lower layer in the IP stack such as the header compression layer. Data packets will then be scheduled and/or dropped (S34) based on the packet classification.

The detection of a rate change based on power ratio information can for example be implemented in the manner described in connection with the first aspect of the invention. Alternatively, the rate change may be detected by means of the data buffer build-up mechanism previously described.

If the link data rate is reduced, it may be desirable to schedule data packets classified as more important for transmission before data packets classified as less important and/or select only a subset of the data packets in a data packet queue (dropping data packets). For example, it may be appropriate to increase the number of transmission attempts for more important data packets, and/or to drop data packets starting with data packets classified as less important.

The simplest classification would result in two different classes (e.g. "important" and "normal"), but it is expected that in the preferred embodiment three different quality classes are used: "Important", "normal" and "less important". A generalization to more classes is possible, and may be desirable depending on the application and the circumstances.

In a particular embodiment of the second aspect of the invention, the data packets comprises media frames such as voice frames in a VoIP application or video frames in an IP-based multi-media application. It has turned out to be particularly useful to classify the media frames of the data packets based on the amount of distortion generated by loss of the respective media frames. More specifically, it is beneficial to classify the frames based on how well the loss of the respective frames can be concealed by means of error concealment. In this case, the classification is preferably performed on the application layer.

However, it is also possible to perform the classification on a lower layer of the IP stack such as the header compression level of the link layer, and classify data packets by classifying the headers of the data packets. The packet headers may be classified based on relative importance with respect to type and/or purpose of the respective headers. Header compression, such as Robust Header Compression (ROHC, see RFC3095) normally defines different types of compressed headers: a larger header for initializing a new (or for restarting an existing) decompression context (RoHC IR packet) and smaller compressed headers.

With header compression, larger headers are normally sent only when necessary for the algorithm, for example to:
Create a new context.
Maintain robustness against decompression failures.
Recover from previous failures.
To update elements in the context, e.g. when the change pattern of the original header do not follow the established patterns.

Header compression normally occurs under the IP layer, i.e. somewhere between the application layer and the MAC layer. Within a single header compressed flow corresponding to one service component, the Service Data Units (SDUs) can be classified by e.g. their relative impact on the context synchronization. In particular, the compressed header types can be classified with having relative importance to each other. For example, for ROHC, IR packets could be classified with the highest importance, while IR-DYN and UOR-2 packets could be classified as more important than smaller packets such as PT-1 and PT-0.

It is also possible to generalize the classification of importance of header compressed packets to not only the type of packet itself (i.e. what it can do and carry as information) but also (or as an alternative) with respect to the purpose of the packet (i.e. the reason why the header compression algorithm selected this packet). In other words, it is desirable to broaden the classification to include the compressor's "view" of the state of the decompressor context, e.g. from impairment events (such as from feedback received) and robustness logic.

For example, a UOR-2 compressed header (RFC3095) can convey little, much or all of the dynamic part of the header compression context for the purposes of:
1) carrying additional sequence information
2) conveying updating pattern changes in the uncompressed header
3) repairing a context as a result of NACK feedback
4) conveying non-updating pattern changes in the uncompressed header
5) "refreshing" the context periodically to increase robustness.

As an illustrative example, a UOR-2 packet from its type and purpose could be classified with a "normal" precedence for case 1, but for case 2 and case 3 it could be classified as "important" and for case 4 and case 5 as "less important".

Then this could be generalized in terms of the combination of "type" and "purpose", which knowledge of the purpose would normally be given by the compressor to the classifier.

Classification of the type and/or purpose of compressed header can easily fit within the preferred classification above (e.g. "important", "normal" and "less important") as well as into a more generalized classification.

The information related to the relative importance of the type and/or purpose of compressed header can be used to refine the classification made at the layers above. Alternatively, it can be used directly as the main and/or sole method for packet classification.

The first aspect and the second aspect of the invention can be combined, using both direct adaptation of the application data rate in response to the early detection of a change in link data rate and selection of data packets further based on a classification of the data packets, as described separately above.

Figure 6:
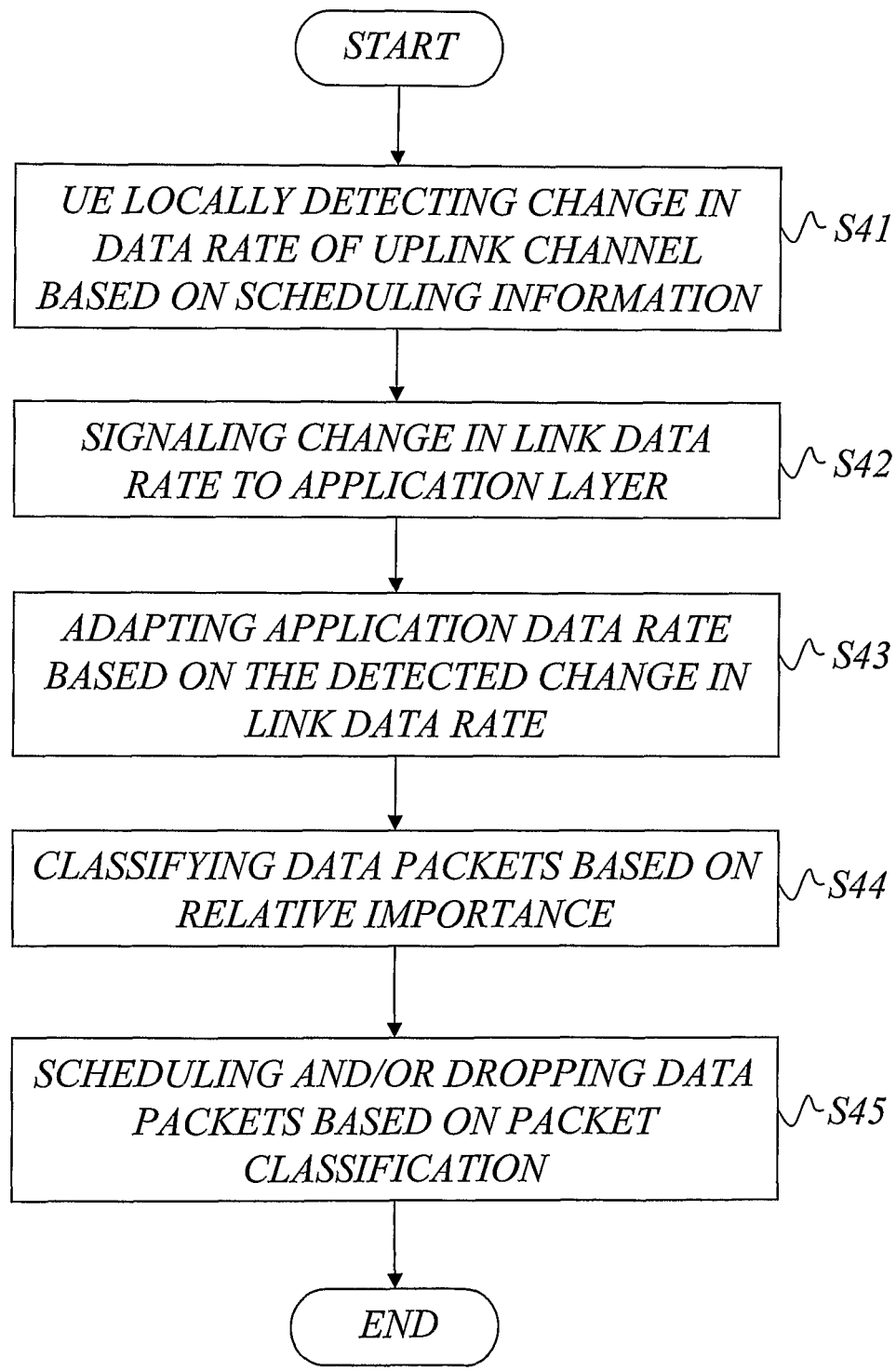
FIG. 6 is a schematic flow diagram of a preferred exemplary embodiment combining the first aspect and the second aspect of the invention.

FIG. 6 is a schematic flow diagram of a preferred exemplary embodiment combining the first aspect and the second aspect of the invention. The user equipment locally detects (S41) a change in link data rate of the uplink channel based on monitored scheduling information. The information of the detected change in link data rate is then signaled (S42) to the application layer, and used to adapt (S43) the application data rate of an IP application running in the user equipment. Data packets are classified (S44) based on relative importance of the respective packets for transfer of information over the uplink channel. This makes it possible to select (S45) data packets based on the classification of data packets so that data packets can be scheduled and/or dropped accordingly depending on the detected change in link data rate.

Figure 7:
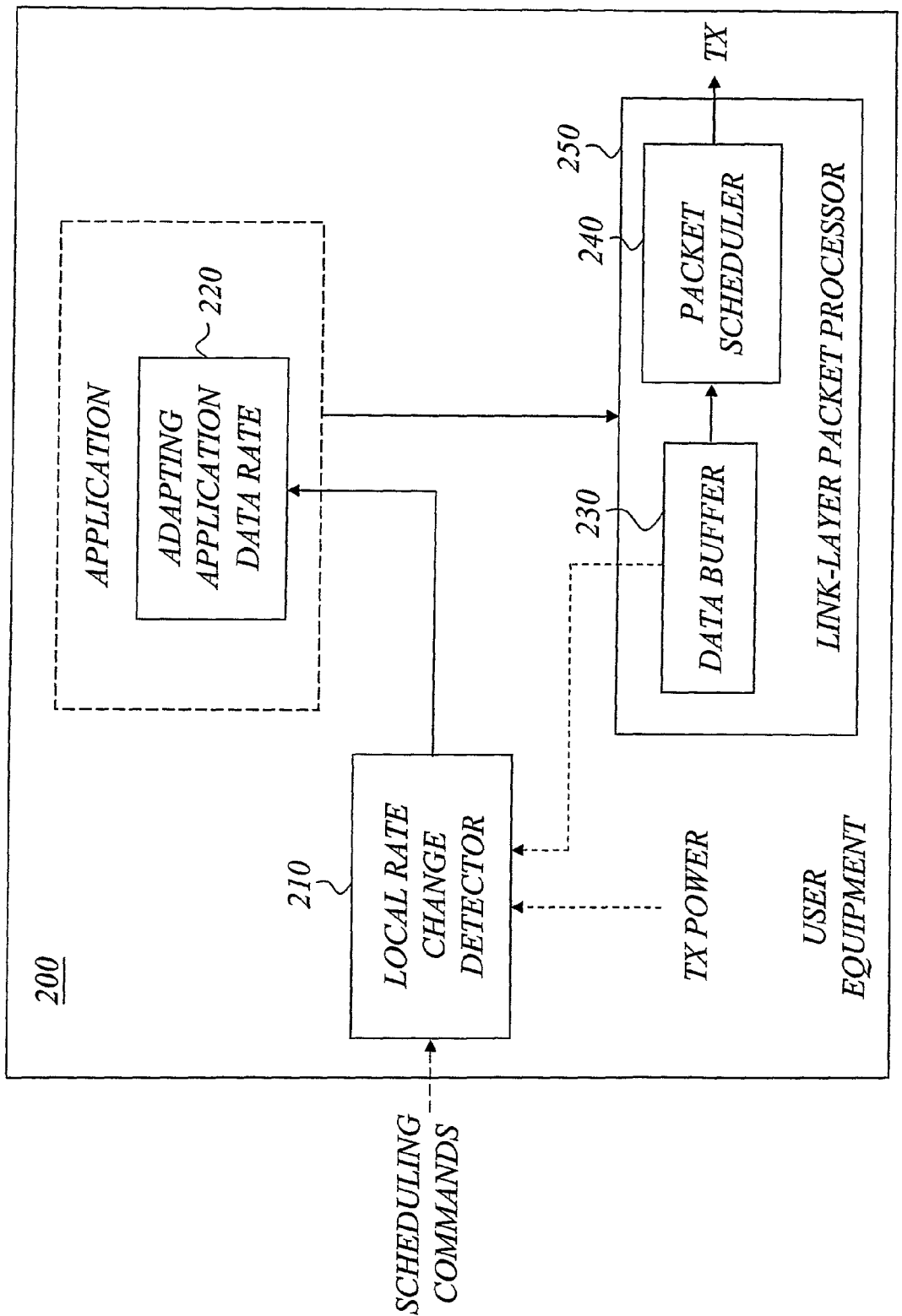
FIG. 7 is a schematic block diagram of a preferred exemplary embodiment according to the first aspect of the invention.

FIG. 7 is a schematic block diagram of a preferred exemplary embodiment according to the first aspect of the invention. The UE 200 comprises conventional radio transceiver functionality and other conventional radio communication units, which will not be discussed in further detail. Those parts that are relevant to the present invention will be discussed in the following. The UE 200 further comprises a local rate change detector 210, a module 220 for adapting the application rate, and a link-layer packet processor 250 including one or more data buffers 230 and a packet scheduler 240. The detector 210 preferably monitors scheduling commands from the base station and extracts scheduling information such as power ratio information from the scheduling commands. This information can then be used by the detector 210 to detect a change in link data rate of the uplink channel. If desired, information on available transmit power is also input to the detector module 210 and used together with the power ratio information to detect a change in data rate. Alternatively, the detector 210 operates based on scheduling information from the data buffer 230, preferably by identifying a build-up of packets in the data buffer and translating the buffer build-up into a rate change. The change in link data rate is normally signaled to the application layer, which adapts the application data rate according to the signaled change in link data rate, by means of module 220. Using the selected data rate, the application transfers application data encapsulated into suitable data packets to the link-layer packet processor 250, where data packets are buffered in the data buffer 230 and scheduled by the packet scheduler 240 for transmission over the uplink channel. Preferably, the application data rate and the link data rate should basically match for optimum performance.

Figure 8:
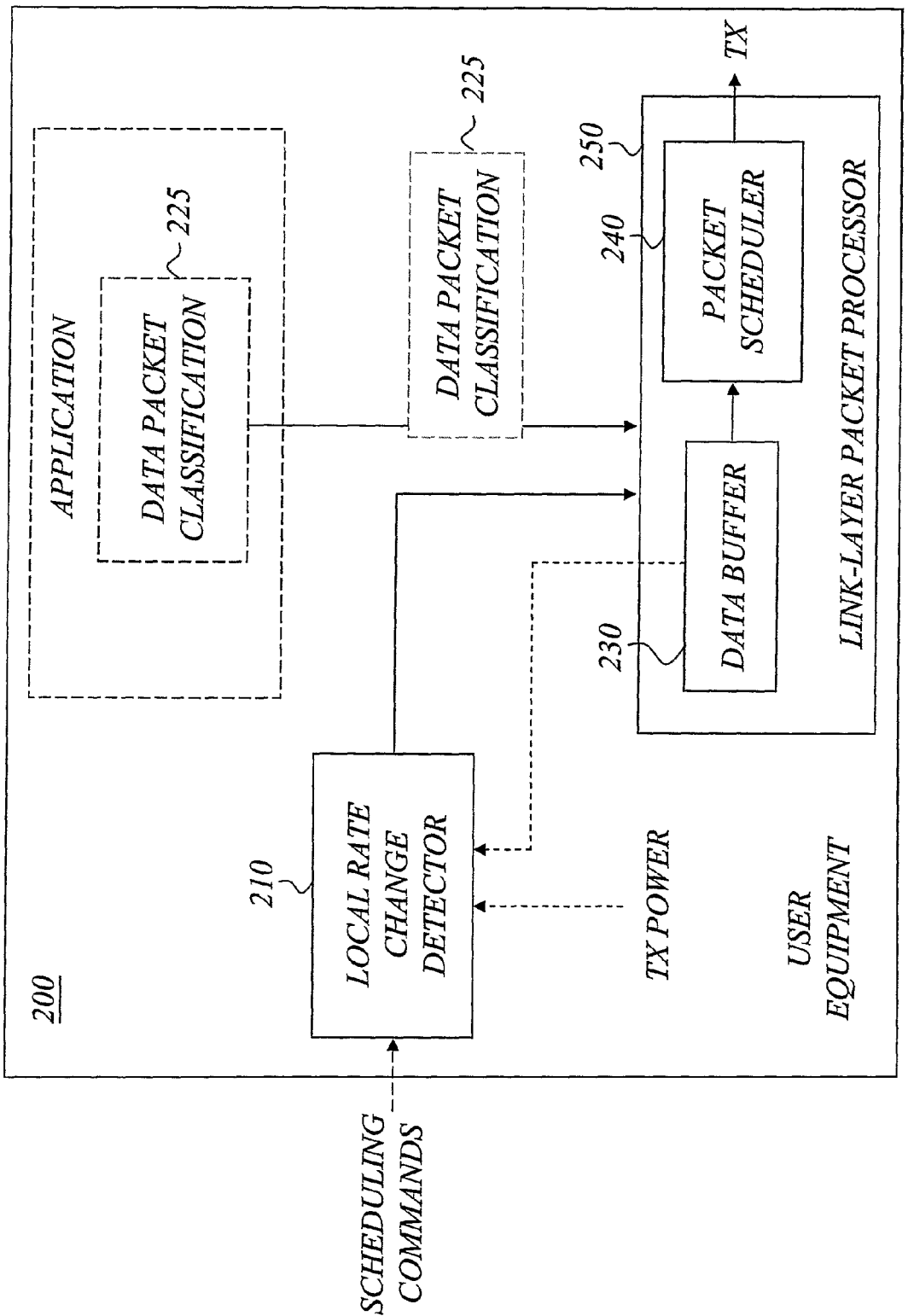
FIG. 8 is a schematic block diagram of preferred exemplary embodiment according to the second aspect of the invention.

FIG. 8 is a schematic block diagram of preferred exemplary embodiment according to the second aspect of the invention. Similarly to the embodiment of FIG. 7, the UE 200 comprises a detector 210 for locally detecting a change in link data rate, as well as a link-layer packet processor 250 including a data buffer 230 and a packet scheduler 240. However, in the embodiment of FIG. 8, the UE 200 also comprises means 225 for data packet classification. For example, the data packet classification can be performed on the application layer, and/or on a lower layer such as the header compression layer, as previously described. The packet classifier 225 preferably classifies data packets based on relative importance of the respective packets for transfer of application data over the uplink channel. This information is preferably passed with each packet to the link-layer packet processor 250. The classification can then be used by the link-layer packet processor 250 to drop less important packets from the data buffer 230 and/or schedule more important data packets before other packets in the packet scheduler 240, depending on the change in link rate.

Figure 9:
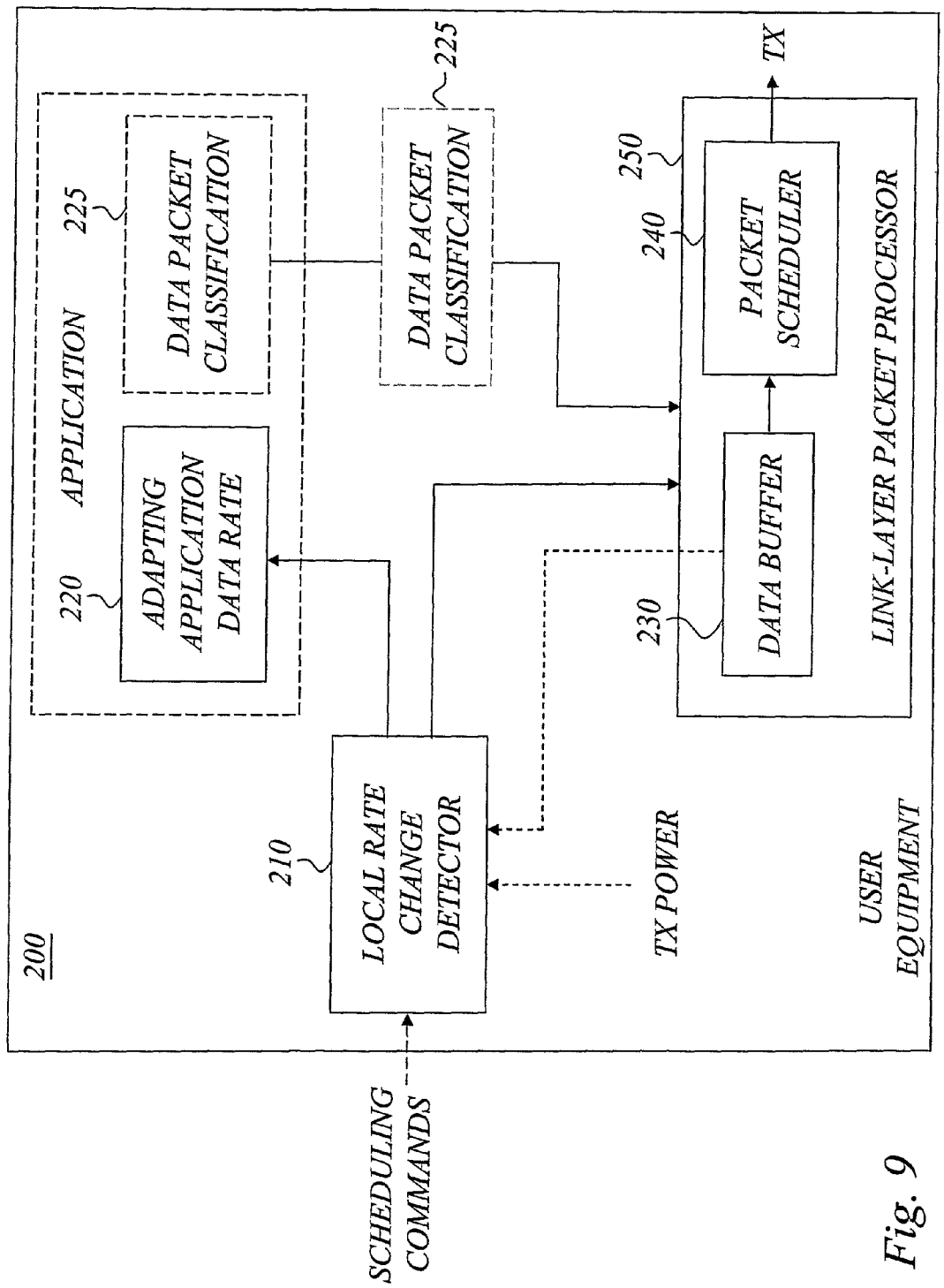
FIG. 9 is a schematic block diagram of a preferred exemplary embodiment combining the first aspect and the second aspect of the invention.

FIG. 9 is a schematic block diagram of a preferred exemplary embodiment combining the first aspect and the second aspect of the invention. In this embodiment, the UE also comprises a detector 210 for direct detection of a change in link data rate, as previously described. The change in link rate is signaled to the application layer, where module 220 operates to adapt the application data rate. The application may also classify packets according to relative importance in module 225. Alternatively, or as a complement, this packet classification is implemented on the header compression layer. Information on the packet classification can then be used by the link-layer packet processor 250 to select data packets for transmission in connection with the data buffer 230 and/or the data packet scheduler 240.

The invention has this far mainly been described in relation to any general arbitrary uplink channel. In the following, however, the invention will be described with reference to the particular example of E-DCH for transmitting IP packets over the WCDMA radio access interface. It should though be understood that invention is not limited to E-DCH, nor to the following detailed examples of implementation.

In a preferred, exemplary embodiment, the invention includes a number of main steps: Preferably, the UE monitors (directly) the used transmission power and scheduling commands from the base station, and based on this information detects the changes in the E-DCH data rate directly. This information on the E-DCH data rate will then typically be signaled to the application, which can select a more appropriate application data rate. The application preferably classifies the voice or media frames based on how well their loss can be concealed in the error concealment unit. This information is normally passed with each packet to the MAC-e sub-layer. MAC-e may the use this information to increase the number of transmission attempts for more important speech or media frames. If packet dropping is necessary, the RLC sub-layer may use the packet classification to determine which packets should be dropped.

Figure 10:
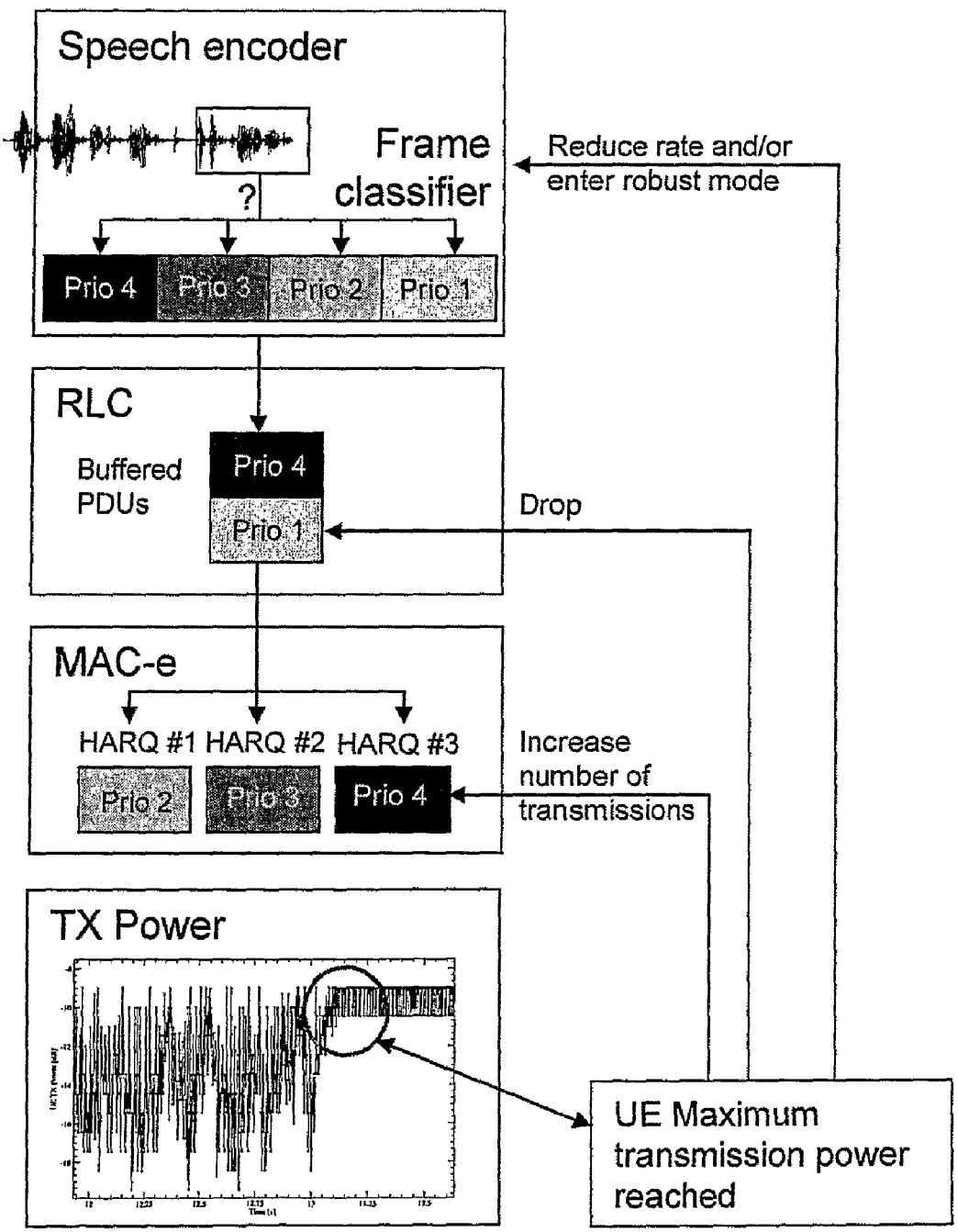
FIG. 10 is a schematic diagram illustrating a particular implementation according to an exemplary embodiment of the invention.

FIG. 10 is a schematic diagram illustrating a particular implementation according to an exemplary embodiment of the invention. This particular embodiment relates to a VoIP application implementing a speech encoder. The VoIP application classifies voice frames based on importance. Frames are buffered in RLC (Radio Link Control) and MAC-e (MAC enhanced) HARQ (Hybrid-ARQ) queues. Upon reaching maximum transmission power, the UE E-TFCI limitation limits the transmission power for E-DPDCH, effectively resulting in lower data rate. Preferably, MAC-e signals to the VoIP application to use a lower rate and/or enter robust mode (with less inter-frame prediction). MAC-e preferably drops least important packets to prevent extensive queuing and spends extra resources (by e.g. extra retransmissions) on more important packets.

Details and variations will be described below.
Determining the Changes to E-DCH Data Rate Existing art trusts the method of detecting blocked/unblocked TFCs (3GPP TS 25.133) to detect the changes in the link layer data rate. In the present invention, a "sufficiently large" E-TFC may still be un-blocked, but excessive power demands result in an increase in the block error rate of the HARQ transmissions, which further results in reduced throughput.

When using E-DCH, there are two mechanisms that can restrict the data rate of an individual UE. First, the base station may lower the current data rate of the UE by updating the serving grant (i.e. by scheduling). Second, the UE may not have sufficient transmission power to maintain the current data rate, in which case the UE will automatically limit the transmission rate. This autonomous reduction typically occurs when the UE is close to the edge of the cell.

Similarly, the rate of an individual UE may be increased by updating the serving grant from the Node B, or—if the UE was power limited—it may increase the rate autonomously as soon as sufficient power comes available.

Both the rate reduction and increase mechanisms operate on the E-DPDCH/DPCCH power ratio $\beta_e$, which determines how much of the total transmission power is spent on the E-DCH. By limiting $\beta_e$ it is possible to limit the number of bits transmitted per TTI and/or increase the number of retransmissions that are needed to successfully transmit a packet. Similarly by increasing $\beta_e$ it is possible to increase the number of bits per TTI and/or reduce the number of retransmissions. In the current E-DCH specification (and configured for each MAC-d flow) every Transport Format (TF, or bits per TTI) maps to a unique offset value $\beta_e$. Thus, the number of HARQ re-transmissions is changed in case:

The UE is power-limited.
The mapping of offsets to Transport Formats is reconfigured.
The SIR of the reference channel (E-DPDCH) is changed.
For example, the UE may obtain information on the E-DCH data rate via two exemplary mechanisms:

1. The UE receives absolute and relative grants from the base station on E-AGCH and E-RGCH channels. These grants contain information on maximum allowed E-DPDCH/DPCCH power ratio $\beta_e$. Any change in $\beta_e$ can then be mapped to increase or decrease in the data rate.
2. The UE estimates the maximum power available for transmitting E-DPDCH. If the UE determines that it does not have sufficient power to reach the current maximum $\beta_e$ it reduces the used $\beta_e$ according to rules specified in 3GPP TS 25.133. This will result in increased number of HARQ re-transmissions and possibly queued data frames. Similarly the UE may determine after reducing the used $\beta_e$ that it now has sufficient power to transmit at higher power, and increases the used $\beta_e$.

The reduced throughput can be also identified through buffer build-up, which is also new relative to 3GPP TS 25.133. Identifying this reduced throughput, and identifying the recovery from HARQ drift are measurement functions that are proposed embodiments.

There are known mechanisms to adapt the application send rate. The application can receive information from its peer application via in-band (e.g. requested codec mode in CS AMR) or out-band (e.g. received packet loss and/or jitter in RTCP receiver reports, or adaptation information in RTCP-APP reports) signaling or alternatively it can monitor the quality of the local link via the received signal strength. An example of such behavior can be found in 3GPP TS 25.133 (section 6.4.2), where the MAC layer shall report to higher layers when the available bit-rate changes. This information can then be used to adjust the application data rate by e.g. using a lower codec rate or alternatively dropping speech frames in the application.

Signaling Change in the E-DCH Rate to the Application

The $\beta_e$ determines the largest allowed Transport Format Combination (TFC). Each TFC contains the number of bits the terminal is allowed to transmit per TTI, but due to retransmissions the TFC can not be directly converted to the application layer bit rate. However, the application level data rate is directly proportional to the value of the $\beta_e$ and thus it is possible to signal the relative rate change to the application. For example, if the $\beta_e$ is reduced to one half, the MAC-e entity would signal that the data rate has been reduced to one half to the application layer.

The application uses this (relative) data rate to determine what encoding mode or bit rate to use for the encoding process.

In an exemplary embodiment (VoIP with AMR), the VoIP application uses this (relative) data rate (from E-DCH) and combines it with the Codec Mode Request (CMR) that is received from the other UE, when it determines what codec mode and/or redundancy mode to use. The combining may be to take the maximum of these two bit rates (or codec modes).

In another exemplary embodiment (video telephony), the application uses this (relative) data rate (from E-DCH) when determining the bit rate and/or the frame rate to use.

In another exemplary embodiment, the application uses this (relative) data rate to determine which service components (e.g. voice, video, text) can be supported. Upon detecting that a component currently used can no longer be supported, the application can remove it. Similarly upon detecting that a component not being currently used could be supported, the application can (possibly based on a feedback from the user) add the component to the call.

Note that as the required transmission power can vary significantly within time, it is expected that a filtered or averaged rate may need to be signaled to the application. For example, 3GPP TS 25.133 specifies that the TFC is in excess power state if the UE transmit power needed is greater than the Maximum UE transmitter power for at least 15 out of the last 30 successive slots (2/3 ms) immediately preceding evaluation, corresponding to 20 ms in time. The TFC is blocked if it has been in excess power state for 50-90 ms (or even higher). For E-DCH a similar procedure could be used, but it can be expected that the measurement periods are shorter, perhaps of the order of 10-20 ms.

Classifying Media Frames

The media frames can be classified in several ways.

If several service components (voice, video, text) are being supported, frames from one component could have absolute priority over components from others.

Within a single service component, the frames can be classified by e.g. distortion based marking, which tries to evaluate how much distortion is generated by its loss. Further information on distortion-based marking can be found in the article "*Source-Driven Packet Marking For Speech Transmission Over Differentiated-Services Networks*", Juan Carlos De Martin, IEEE International Conference on Audio, Speech and Signal Processing, Salt Lake City, USA, May 2001. for voice communication but other implementations (e.g. for video) are also possible.

The simplest classification would result in two different classes (e.g. "important" and "normal"), but it is expected that in the preferred embodiment three different quality classes are used: "Important", "normal" and "less important". A generalization to more classes is possible, and may be desirable.

Classifying Service Data Units Containing Media Frames

In order to save radio resources, IP header compression is normally applied to the IP packets that are used to transport the media frames. Header compression, such as Robust Header Compression (ROHC, see RFC3095) normally defines different types of compressed headers: a larger header for initializing a new (or for restarting an existing) decompression context (RoHC IR packet) and smaller compressed headers where each type conveys slightly different combination of information based on the change probabilities of the different fields of the protocol header being compressed.

The IR packet is roughly the same size as the uncompressed IP header, which in itself may be relatively large with respect to e.g. the media frames contained as payload. The RTP/UDP/IPv4 header size is normally 40 octets, and the RTP/UDP/IPv6 header size is normally 60 octets. The IR packet includes both the fields that are expected not to change for the flow—static fields—and those that are expected to change—dynamic fields. IR packets are sent at the beginning of the compression to initialize a new context, and may later be sent periodically (unidirectional operation) or upon request (static-NACK) from the decompressor (bidirectional operation) to recover from severe decompression failure(s).

The somewhat smaller IR-DYN conveys all the dynamic information only, leaving out the static header information. Its size is around 18 to 20 octets (IPv4/IPv6). IR-DYN packets are useful to recover from repeated decompression failure when it is assumed to be caused from synchronization loss for the dynamic context information between compressor and decompressor (e.g. transmitted when a NACK is received in bidirectional operation). It may also be used periodically to refresh the context e.g. in unidirectional operation.

Smaller packets are sent when the compression ratio is optimum. The compressed headers for these packet types range from 1 octet (IPv4, UDP checksum disabled) or 3 octets (IPv6) up to 18 octets.

With header compression, larger headers are normally sent only when necessary for the algorithm, for example to create a new context, maintain robustness against decompression failures, recover from previous failures, and to update elements in the context (e.g. when the change pattern of the original header do not follow the established patterns).

Header compression normally occurs under the IP layer, i.e. somewhere between the application layer and the MAC layer. Within a single header compressed flow corresponding to one service component, the Service Data Units (SDUs) can be classified by e.g. their relative impact on the context synchronization. In particular, the compressed header types can be classified with having relative importance to each other; e.g. for ROHC, IR packets are of the highest importance while IR-DYN and UOR-2 packets are more important than smaller packets (PT-1 and PT-0).

Classification of the type of compressed header can easily fit within the preferred classification above (e.g. "important", "normal" and "less important") as well as into more generalized classification.

The information related to the relative importance of the type of compressed header can then be used to refine the classification made at the layers above. Alternatively (when no classification information is provided by upper layers, or when otherwise desired), it can be used directly as the classification method for the purpose of increasing the probability of successful transmission of SDUs with a compressed header type of a higher relative importance (e.g. IR, IR-DYN, UOR-2), or when managing the queue and dropping first packets that only have smaller headers and that are of less relative importance to the header compression algorithm.

As previously mentioned, it is also possible to generalize the classification of importance of header compressed packets to not only the type of packet itself (i.e. what it can do and carry as information) but also with respect to the purpose of the packet (i.e. the reason why the header compression algorithm selected this packet). In other words, it is desirable to broaden the classification to include the compressor's "view" of the state of the decompressor context, e.g. from impairment events (such as from feedback received) and robustness logic.

While ROHC is the preferred header compression algorithm, the idea is not limited to ROHC and is just as applicable to any other header compression algorithms, in particular those defined by RFC1144, RFC2507, RFC2508, RFC3095, RFC3545, RFC3843, RFC4019, RFC4164, IETF draft "*The Robust Header Compression (ROHC) Framework*", Nov. 29, 2006, and IETF draft "*Robust Header Compression Version 2 (ROHCv2): Profiles for RTP, UDP, IP, ESP and UDP Lite*", Sep. 6, 2006, and IETF draft "*Robust Header Compression (ROHC): A profile for TCP/IP (ROHC-TCP)*", Dec. 11, 2006.

Enhancing Transmission of Important Frames

The UE can increase the probability of a successful transmission by continuing to transmit a HARQ PDU. However, as this will reduce the data rate available for the application layer, the MAC-e entity should do this only for selected packet, starting from packets classified as "important". It might also be necessary to drop packets, in which case the packets classified as "less important" should be dropped before "normal" and "important".

Actively Managing RLC Queue

In order to preserve the conversational quality, it is necessary to prevent building up too large a queue in the RLC sub-layer. At simplest, this can be achieved by first dropping packets that have been classified as having the lowest priority (e.g. "less important") and then proceeding to dropping packets with higher priorities.

The invention allows voice over E-DCH function better. The invention especially enhances the VoIP over E-DCH operation at difficult radio conditions (e.g. at coverage border) and at congested system.

The embodiments described above are merely given as examples, and it should be understood that the present invention is not limited thereto. Further modifications, changes and improvements which retain the basic underlying principles disclosed and claimed herein are within the scope of the invention.

Abbreviations

IP Internet Protocol
IPv4 IP version 4
IPv6 IP version 6
VoIP Voice over IP
E-DCH Enhanced Dedicated Channel
WCDMA Wideband Code Division Multiple Access
HSDPA High Speed Packet Data Access
AMR Adaptive Multi-Rate
TTI Transmission Time Interval
ARQ Automatic Repeat request
HARQ Hybrid ARQ
UE User Equipment
DPCCH Dedicated Physical Control Channel
E-DPDCH Enhanced Dedicated Physical Data Channel
MAC Medium Access Control
MAC-d MAC dedicated
MAC-e MAC enhanced
RLC Radio Link Control
TF Transport Format
TFC Transport Format Combination
E-TFC Enhanced TFC
SIR Signal to Interference Ratio
RTP Real-time Transport Protocol
RTCP RTP Control Protocol
RTCP-APP Application-defined RTCP packet
E-AGCH Enhanced Absolute Grant Channel
E-RGCH Enhanced Relative Grant Channel
CMR Codec Mode Request
PDU Protocol Data Unit
SDU Service Data Unit
ROHC Robust Header Compression
IR Initialization and Refresh
IR-DYN IR-DYNamic part
UOR-2 Packet Type 2, common for U/O/R modes
PT-1 Packet Type 1
PT-0 Packet Type 0

The invention claimed is:

1. A method for improving the performance of an uplink channel between user equipment implementing an Internet Protocol (IP) stack and a base station in a wireless communication system, wherein said method comprises the steps of:
said user equipment monitoring scheduling information;
said user equipment locally detecting a change in link data rate of said uplink channel based on said scheduling information;
signaling a relative change in data rate to an application layer, and
adapting an application data rate of an IP application based on the signaled relative change in data rate, wherein
said step of adapting an application data rate comprises the step of determining which service components to support for a given application based on the signaled relative change in data rate, and
said step of adapting an application data rate is initiated from the network side of said wireless communication system.

2. The method of claim 1, wherein said scheduling information is received from the base station.

3. The method of claim 1, wherein said uplink channel is a dedicated data channel, and said scheduling information comprises information on a power ratio that determines how much of the total transmission power of the user equipment to spend on said dedicated data channel.

4. The method of claim 3, wherein said step of said user equipment detecting said change in data rate is based on detecting a change in power ratio signaled from said base station.

5. The method of claim 3, wherein said step of said user equipment detecting said change in data rate is based on determining whether said user equipment has sufficient transmission power to reach a current power ratio signaled from said base station.

6. The method of claim 1, wherein said scheduling information comprises information representative of the status of a data buffer in said user equipment, and said step of locally detecting a change in data rate comprises the step of locally identifying a data buffer build-up in said user equipment.

7. The method of claim 1, wherein said method further comprises the step of signaling a relative change in data rate of said uplink channel to said application, and said step of adapting an application data rate is based on the relative change in channel data rate.

8. The method of claim 1, wherein said step of adapting an application data rate is performed on the application layer in said user equipment.

9. The method of claim 1, further comprising the steps of: —classifying data packets based on relative importance of the respective data packets for transfer of information over said channel; selecting data packets for transfer of information over said channel based on the classification of data packets.

10. The method of claim 1, wherein said uplink channel is based on the Enhanced Dedicated Channel (E-DCH) for transmitting IP packets over the WCDMA radio access interface.

11. User equipment implementing an Internet Protocol (IP) stack and adapted for packet-based radio communication with a base station in a wireless communication system, wherein said user equipment comprises:
- means for monitoring scheduling information;
- means for locally detecting a change in link data rate of an uplink channel from said user equipment to said base station based on said scheduling information;
- means for signaling a relative change in data rate to an application layer; and
- means for adapting an application data rate of an IP application based on the signaled relative change in data rate, wherein
  - said means for adapting an application data rate comprises means for determining which service components to support for a given application based on the signaled relative change in data rate, and
  - adaptation of an application data rate is initiated from the network side of said wireless communication system.

12. The user equipment of claim 11, further comprising means for receiving said scheduling information from the base station.

13. The user equipment of claim 12, wherein said uplink channel is a dedicated data channel, and said scheduling information comprises information on a power ratio that determines how much of the total transmission power of the user equipment to spend on said dedicated data channel.

14. The user equipment of claim 13, wherein said means for detecting a change in data rate is operable for detecting a change in power ratio signaled from said base station.

15. The user equipment of claim 13, wherein said means for detecting a change in data rate is operable for determining whether said user equipment has sufficient transmission power to reach a current power ratio signaled from said base station.

16. The user equipment of claim 11, further comprising: means for classifying data packets based on relative importance of the respective data packets for transfer of information over said channel; and means for selecting data packets for transfer of information over said channel based on the classification of data packets.

17. The user equipment of claim 11, wherein said user equipment is adapted for supporting an uplink channel based on the Enhanced Dedicated Channel (E-DCH) for transmitting IP packets over the WCDMA radio access interface.

* * * * *